June 3, 1969
R. K. HOFFMAN
3,447,562
AUTOMATIC LIQUID SUPPLY APPARATUS
Filed Nov. 25, 1966
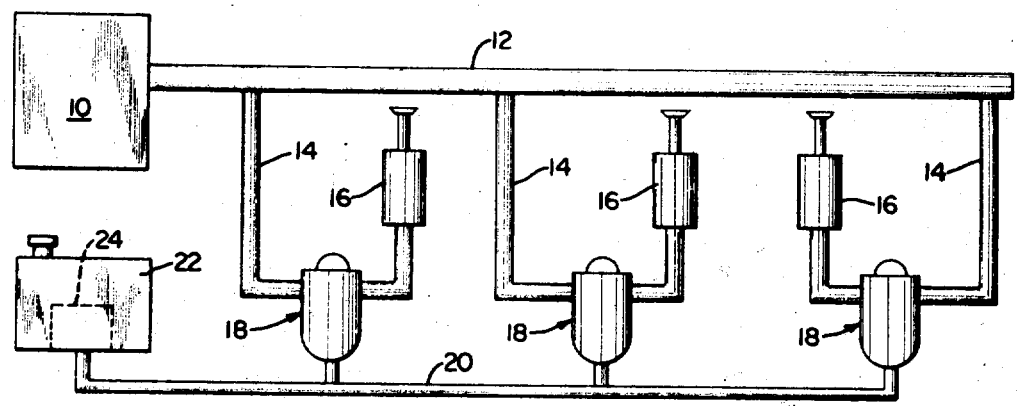
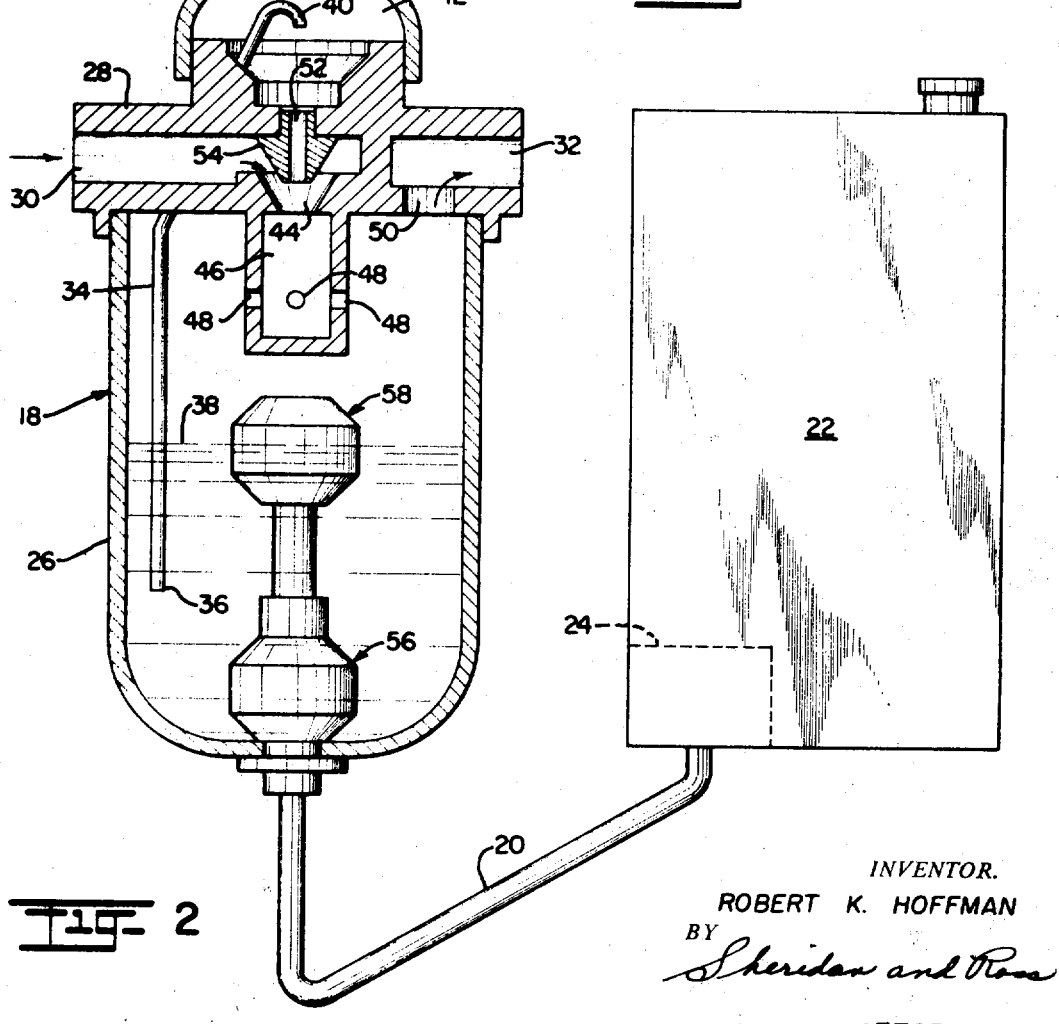
INVENTOR.
ROBERT K. HOFFMAN
BY
Sheridan and Ross
ATTORNEYS

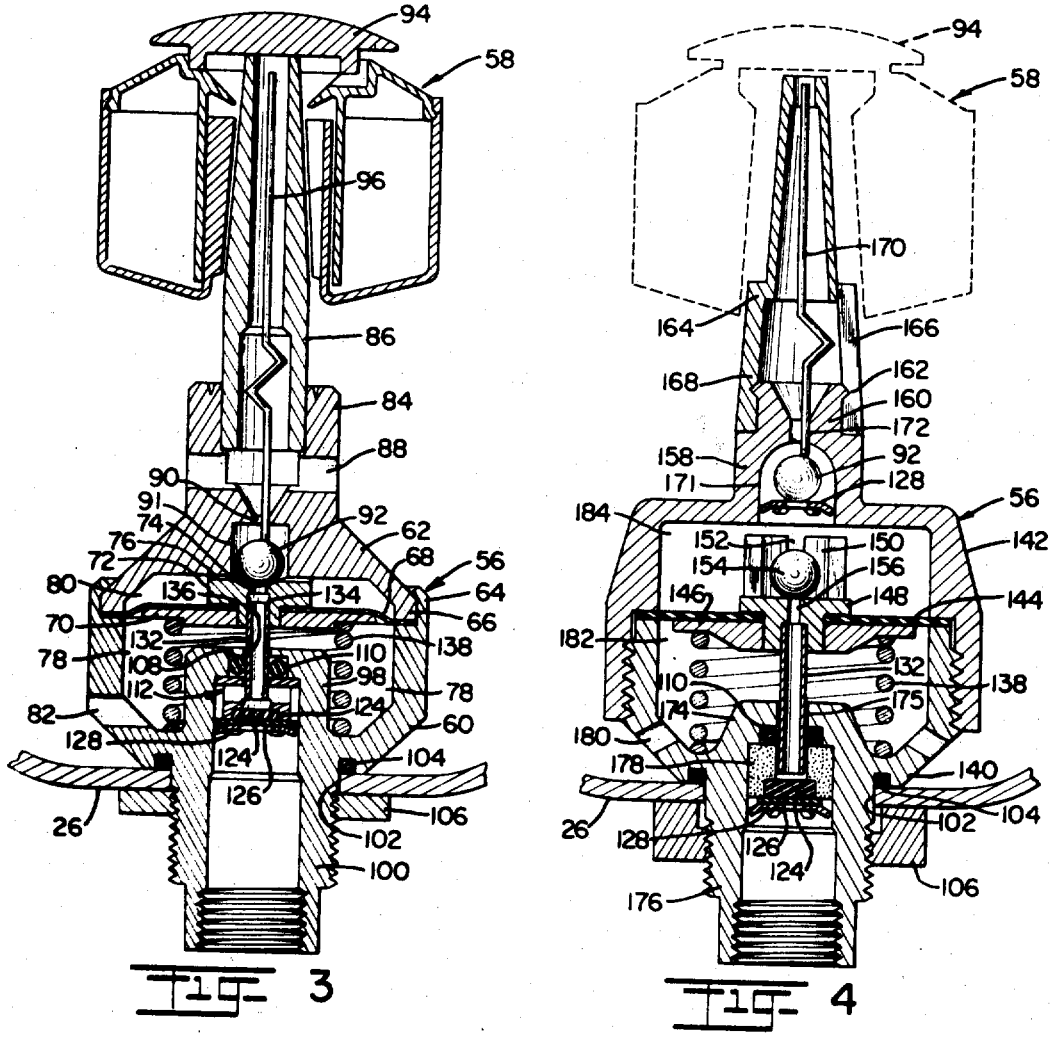

United States Patent Office 3,447,562
Patented June 3, 1969

3,447,562
AUTOMATIC LIQUID SUPPLY APPARATUS
Robert K. Hoffman, Littleton, Colo., assignor to
C. A. Norgren Co., Littleton, Colo., a corporation
of Colorado
Filed Nov. 25, 1966, Ser. No. 597,125
Int. Cl. F16k *31/18;* F01m *1/00;* F16n *17/06*
U.S. Cl. 137—414
20 Claims

ABSTRACT OF THE DISCLOSURE

This invention lies in the general field of apparatus for providing a supply of liquid for use by a liquid using system. While not so limited, it relates more particularly to apparatus for supplying lubricant to a compressed air power system to internally lubricate various air tools and devices. It is directed primarily to automatic liquid filling control apparatus for transmitting liquid lubricant from a source of supply to an individual lubricator or station or a plurality of remote lubricators or stations.

Background of the invention

Industry today relies extensively upon compressed air power to operate hand tools, stationary machine tools, and many other devices to perform industrial functions. In order to obtain the best performance and to reduce wear and maintenance costs to a minimum it has been found that three things are essential. All harmful contaminants must be removed, the air pressure must be regulated, and a sufficient amount of lubricant must be injected into the air to adequately lubricate all bearing surfaces contacted by the air. Separate devices are used for each of these functions.

It is particularly necessary to locate the pressure regulators close to the point of application because individual tools require pressures different from that existing in the main line. It is equally desirable to locate the lubricators close to the point of application to minimize depositing out of lubricant in the lines. While the contaminant removing filters may work quite successfully in the vicinity of the central supply, it is still desirable to locate them close to the individual tools to filter out any dirt or water that may be found in branch lines. Ordinarily the three devices are connected directly together for compactness and convenience.

These devices are not always serviced properly although normally the pressure regulator needs no service after an initial setting. The filter must be drained regularly and the lubricator should be filled regularly and properly. Automatic drains for filters are in common use and provide little problem because the discharge merely goes to waste. Lubricators with automatic fillers connected to a central supply, as well as those periodically filled individually or collectively with liquid from a liquid supply, should have means to preclude overfilling thereof regardless of supply pressure, means preventing any loss of liquid thus supplied, and means permitting quick and speedy filling and it is the primary object of this invention to provide an automatic liquid filling control device for a service container or lubricator of the type described which furnishes all of such means and other advantages.

There are several different lubricators presently available which are provided with filling apparatus but they are not entirely satisfactory for various reasons such as the lack of one or more of the stated means in the previous paragraph. The lubricating portions of all of them are basically the same. A venturi or nozzle of some kind is used to atomize oil supplied by a drip device, and the entrained mist or fog is carried by the air to the working tool. Oil is supplied to the drip device from the liquid in the container or supply line and controlled by the pressures or relative pressures of the oil in the container and the air in the air line.

The present invention overcomes the difficulties of the prior lubricator devices by providing a service container or lubricator bowl to hold liquid lubricant and a filling control device which operates to admit liquid to the container at any time when the supply pressure is above container pressure by a small amount, such as 2 to 5 p.s.i., and permits filling quickly and speedily and yet precludes overfilling regardless of supply pressure and the latter, as is well known, is important in insuring proper lubricator operation. It results in filling at a very constant flow rate regardless of whether the container is pressurized or not, and the rate is independent of any container pressure as long as supply pressure exceeds container pressure by said small amount or by higher amounts constituting wide ranges of pressure differences. It automatically prevents reverse flow out of the service container in the event that the supply pressure is disconnected or falls below the container pressure. The filling control device is so compact that it can be mounted in a standard manual-fill container and still allow storage of a considerable quantity of lubricant therein.

Generally stated, in one preferred form the apparatus comprises a service container or lubricator bowl adapted to hold a desired quantity of liquid lubricant and a feed line extends down from the drip chamber into the liquid with its inlet at a desired depth below the liquid surface. A liquid filling control device is provided in the form of a hollow actuating chamber which is preferably mounted within and at the bottom of the service container. The chamber has an inlet port in its bottom wall including a conduit section which passes through an aperture in the bottom wall of the container to be connected continuously or intermittently to a further conduit leading from a supply reservoir or source. The source or reservoir itself may be pressurized or a pump may be provided between the reservoir or source and the container to pressurize the supply liquid to a level above the pressure in the container. The pressure differential preferably is at least 5 p.s.i. and may be much higher without affecting the operation of the device.

The chamber is provided with a movable partition divided it into first and second, or lower and upper compartments, the latter functioning as a control chamber. Conduit means extends from the inlet port to the second compartment to transmit the pressurized liquid thereto, and in the preferred form it extends through the partition and is movable with it. Valve means are provided at the inlet port to cut off the supply and may comprise a stationary sealing member with which the lower inlet end of the conduit means may engage to close off the inlet end. When the partition moves away from the inlet port it carries the conduit means with it, thus opening the flow path. When the partition and conduit means move toward the inlet, the flow path is closed.

The first compartment has one or more ports in its wall which are continuously open to the liquid in the container and thus to the container pressure. The second compartment or control chamber has a port in its wall which is also open to the container and its pressure but it is also provided with a valve device to close off the port on occasion. The container pressure on the two sides of the partition balance each other out, this being important, and a resilient means preferably in the form of a coil spring, is mounted in the first compartment to exert a yielding force to urge the partition away from the inlet port to normally hold the valve means open. With the valve device also open, the pressure differential will cause the pressurized liquid to pass through the inlet port, conduit means, second compartment, and its port to fill the container.

In order to limit the filling to the desired level and thus prevent overfilling a hollow mast is provided which extends upwardly from the second compartment and is in communication with its port. The mast is also provided with one or more side ports to complete the flow path to the container. A symmetrical float surrounds the mast and has a portion which overlies its open upper end. An actuator member in the form of a slender elongate rod is loosely slidable in the mast and is slightly longer than the distance from the top of the mast to the port in the upper compartment. When the float is resting on the top of the mast, the rod will hold the valve device off its seat in the port so that the flow path will remain open. When the float is raised by the liquid in the container, the valve device is free to close.

As previously stated, when the entire flow path is open, liquid from an intermittent or continuous source will rise through the device to fill the container and there will be no force to close the inlet port valve means. However, when the liquid reaches the desired level, the float rises and the actuator member no longer restrains the valve device. The force of the liquid flow now moves the valve device into port closing position to thus preclude overfilling. As soon as the outflow from the second compartment ceases, the further inflow of pressurized liquid raises the pressure in the second compartment, and the increase in volume and pressure overcomes the force of the spring to move the partition and conduit means toward the inlet port to close the valve means.

It will be seen therefore that the valve device is positively closed as soon as the liquid rises to the desired level in the container, and no additional force can cause any more liquid to enter the container. Inflow is barred by a positive valve device rather than by the buoyancy of the float, and the latter does not have to withstand the pressure of the supply liquid. Also the inlet valve means is closed by a very modest differential pressure which may exert a total force of only a pound or two and this is very important.

The area of the port from the second compartment or control chamber to the container is very small so that only a very small closing force is exerted on the valve device by the pressure in the chamber. Hence, when sufficient liquid is drawn from the container by the drip device to lower the float onto the mast, its weight on the actuator member is sufficient to force the valve device off its seat. As soon as the valve device opens, the excess pressure in the second compartment is relieved, the spring forces the partition away from the inlet port, and the flow path is again completely open for communicating with an intermittent or periodic supply which, when operated, causes liquid to be added to the container resulting, as explained, in rising of the float and closing of the valve device and the cycle discussed may be repeated. With a continuous supply the cycle is automatically repeated when the oil level falls with the float rising and falling only, for example, a small fraction of an inch during the cycle and hence the liquid level in the lubricator or container is maintained substantially constant for all practical purposes.

Upon disconnecting the intermittent or periodic liquid supply means or if the continuously applied supply pressure should fail for any reason it is important that the liquid then present in the container be retained to provide proper lubrication. For this purpose a valve device is provided at the end of the conduit means in the second compartment which is immediately actuated by outflow to close off the conduit and prevent reverse flow therethrough. Only a few drops can pass before sealing is effective. The valve device described above may serve this dual purpose or a second similar valve device may be used.

The flow path is restricted at one or more points so that the flow will be uniform but of course a relatively speedy and quick liquid filling results as the flow areas are still relatively large. Due to the area of the port from the control chamber to the container and the hollow chamber and associated structure which functions as a pressure regulator all to maintain a minimum pressure differential across the liquid flow orifice of the fill device, all required operating forces are kept low so that a float of minimum size and weight may be used.

Various other advantages and features of novelty will become apparent as the description proceeds in conjunction with the accompanying drawings, in which:

FIGURE 1 is a schematic layout of a typical compressed air power system provided with apparatus for supplying liquid lubricant to the system;

FIGURE 2 is a schematic view of a typical lubricator provided with the automatic liquid filling control apparatus of the invention;

FIGURE 3 is a vertical sectional view of one form of the apparatus but omitting the liquid with which it is associated.

FIGURE 4 is a similar view of a modified form of the apparatus;

FIGURE 5 is a perspective view, partly in section, of a metering and seal-holding plug;

FIGURE 6 is a plan view of a star washer securing device; and

FIGURE 7 is a plan view of a triangle plate holding device.

The typical compressed air power system illustrated in FIGURE 1 includes a compressed air supply source 10, a main line 12, and branch lines 14 supplying compressed air to power tools 16. A lubricator 18 is interposed in each branch line close to the power tool to provide the desired lubricant mist. The lubricators are fed by a line 20 from a lubricant supply reservoir 22. Pressurization is provided by a pump 24 which may be mounted internally as shown or externally. It may be arranged to pressurize the tank itself or to take liquid from the tank and pump it into line 20. The pump may be continuously or intermittently operated or liquid may be pumped from reservoir 22 or other supply means through individual lines to each lubricator 18 and such may be on a continuous or intermittent basis insofar as the true essence of this invention is concerned.

A typical lubricator is shown schematically in FIGURE 2. For a detailed description of such a lubricator, reference may be had to U.S. Patent No. 2,890,765, issued to Morley V. Friedell and assigned to the assignee of the present invention. Stated briefly, the lubricator 18 comprises a service container 26 having a head member 28 provided with an inlet 30 and an outlet 32. A drip feed tube 34 has a lower inlet end 36 extending into the liquid to a specified depth below the surface 38 and an upper outlet end 40 in dome 42. Air entering at 30 passes through venturi 44 into expansion chamber 46, through ports 48 into the container, and then through port 50 into outlet 32 and on to the associated power tool.

The vacuum produce in the venturi throat is transmitted through passage 52 in fitting 54 to dome 42, causing oil to be drawn up through tube 34 and to drip down through fitting 54. When it meets the air stream in the venturi throat it is atomized and the finer particles are carried as a mist with the air flowing through outlet 32. The heavier particles fall into the container 26. It is to be understood that lubricator 18 is merely exemplary and not restrictive of the principles of this invention and that the subject apparatus will function equally as well with many types of lubricators such as those of U.S. patent application Ser. No. 462,356, owned by the assignee of this invention, or of U.S. Patents Nos. 2,718,934, 2,747,688 and 2,751,045.

Now as to the preferred form of this invention illustrated in FIGURE 3, such essentially includes an actuating chamber containing certain structure and associated float 58. The latter could be a conventional float but is in fact a special float open to the gas in the float chamber at all times so that it does not have to resist any pressure differential. It is also self purging so that it can never become "waterlogged." Its construction and operation are fully disclosed in the copending U.S. patent application, Ser. No. 483,397 filed Aug. 30, 1964 and assigned to the assignee of the present invention. The hollow actuating chamber 56 comprises a pair of casing shells 60 and 62, preferably although not necessarily generally cylindrical, having overlapping marginal portions 64 and 66 tightly secured together and clamping between them the margin of a movable partition 68 which is a flexible diaphragm centrally clamped between two rigid members 70 and 72. The latter has a central vertical passage or port 74 forming a liquid flow orifice and serving as a portion of a conduit means later to be described. The upper margin of passage or port 74 constitutes a seat to receive a valve device for closing off the port on occasion, and the upper face of member 72 is provided with several radial grooves 76 for flow of liquid.

The partition divides the interior of the chamber into first and second, or lower and upper, compartments 78 and 80. One or more ports 82 in the wall of compartment 78 connect directly to the interior of the container, so that this compartment is always open to container pressure. The upper wall of shell 62 is provided with a hollow boss 84 which serves as a base or lower portion of hollow mast 86 and is provided with side ports 88 which is in communication with the liquid in the container. Shell 62 is also provided with a central port 90 at the top of an area 91 which is in alignment and communication with the interior of mast 86 so that there is a flow path from the second compartment 80 to the container, and hereinafter reference to control chamber includes, in the embodiment of FIGURE 3, grooves 76, area of port 90 as well as the compartment 80. However this flow path may be blocked on occasion by a valve device shown here as a sphere or ball 92 adapted to contact the seat of port 90 to complete the closure.

Float 58 is formed to surround mast 86 and is provided with a central cap portion 94 which overlies the open upper end of the mast and contacts it when the float falls to a predetermined level. An actuator member 96 in the form of a slender elongate rod or wire loosely fits in the passage through the mast so that it slides longitudinally and does not completely fill the opening in area 91. The rod itself never blocks the flow path. It is slightly longer than the distance from the top of mast 86 to the seat of port 90. Consequently, when cap 94 rests on top of the mast, the rod will hold valve device 92 off the seat and keep the flow path open. When the float rises a predetermined small amount, only a small fraction of an inch is the selected distance in the embodiment shown, the valve device is free to again contact the seat and close the flow path.

A hollow boss is formed in the lower wall of shell 60 to provide an intake passage for pressurized liquid. It includes an inner section 98 projecting into compartment 78 to constitute the inlet port and an outer conduit section 100 which passes through an aperture 102 in the bottom of container 26 for connection to the lubricant supply, such as line 20. The chamber is sealed to the container by O-ring 104 and is clamped in position by nut 106.

Inlet section 98 is provided with a shouldered recess 108 to receive O-ring seal 110, which is held in place by metering plug 112, illustrated in detail in FIGURE 5. This plug comprises upper and lower cylindrical sections 114 and 116, the upper section being of the same diameter as the inlet section bore and the lower section being slightly smaller to provide an annular liquid passage between it and the wall of the inlet section bore. The plug is provided with a central vertical bore 118 intersected by a cross passage 120 in the lower section. There is also an annular recess 122 in the bottom of the lower section to receive the liquid impermeable seal member 124. The seal member is held in the recess and the plug is retained in the bore by a triangle plate 126, see FIGURE 7, and a star washer 128, see FIGURE 6. The latter is provided with a plurality of spring fingers 130, bent slightly downward, which bite into the wall of the bore when the washer is pushed into place, thus preventing loosening or removal of the plug and seal. The shapes of the plate and washer allow liquid to pass to the plug.

The flow path is completed by conduit means 132 which is fixed in bore 134 of the upper diaphram plate 72, with the port 74 completing a passage extending entirely through the movable partition. The conduit means 132 moves vertically with the partition and slides through passage or port 136 in the top of inlet section 98, being sealed by O-ring 110 to prevent leakage of any liquid from the inlet section into the lower compartment 78. When the partition is moved toward the inlet port, the lower inlet end of member 132 contacts seal member 124 and the two cooperate as valve means to close off the flow path. When the partition moves away from the inlet port 136 it carries member 132 with it and pressurized liquid then flows through cross passages 120 into conduit means 132 and thence into the control chamber formed by the second or upper compartment, grooves 76 and area 91. As seen in FIGURE 3, the valve device is held off the seat of port 90 and therefore liquid will flow through 90 and 88 into the container 26.

A further element in the automatic filling control is a resilient means to urge the partition away from the inlet port and thus open the valve means, and it takes the form of a coil spring 138 which surrounds the boss portion 98 and is mounted in compression between shell 60 and partition 68. Since port 90 is open, container pressure is applied to both faces of the partition and is substantially balanced. Therefore the force of spring 138, which need not be much more than one pound, will move the partition away from the inlet port to the position shown and thus normally hold open the valve means consisting of seal member 124 and the inlet end of conduit means 132. Passages 120 in plug 112 and the small gap between them and the inlet end of member 132 serve as metering means to somewhat restrict the flow path to achieve a substantially constant fill rate which will not create a force overcoming the weight of the float 58 on the actuator member 96. Therefore the container will be filled up to the desired predetermined liquid level 38 and since the flow areas are relatively large the filling will still be relatively quick and speedy.

As long as port 90 remains open, the inlet valve means will remain open. However, when the liquid reaches a predetermined level it will raise float 58 a short distance and relieve the downward pressure on actuator 96. The flow around ball 92 promptly moves it up to seal port 90. As the pressurized liquid continues to flow into the control chamber, the pressure therein promptly begins to climb and quickly overcomes the force of spring 138 resulting in lowering the partition and conduit means and closing off the inlet valve means formed by member 124 being engaged by conduit means 132. To accomplish the latter only a very slight increase in volume and liquid pressure is required and thus it can be seen that the hollow chamber 56 and associated structure including the control chamber functions as a pressure regulator to maintain a minimum pressure differential across the liquid flow orifice 74 of the device.

Conditions will now remain static until enough liquid is withdrawn from bowl 26 to lower the float back on to the top of the mast. When this occurs, rod 96 again forces ball 92 off its seat to open port 90 at which time the apparatus will function in either of the following manners depending upon whether the liquid supply is furnished intermittently or continuously. Let us assume that, referring to FIGURES 1 and 3, liquid is supplied from reservoir 22 to all three lubricators 18 on a continuous basis because the user so desires that a plurality of lubricators be constantly supplied or such have to be because of difficulty of access. In this event, each lubricator and fill control device operates to perform another function, namely to maintain a substantially constant level of liquid in bowl 26. The lubricant in the bowl 26 is replenished automatically entirely in response to a small change in liquid level (certain structure, such as the length of rod 96 and the depth of area 91, may be varied in the embodiment shown to alter the amount of such change) which controls the inflow regardless of variations in air pressure from source 10 or liquid supply pressure or in other words there is automatic cyclic action. For example, referring to the detailed description wherein it is stated that element 92 closes port 90 and pressure builds up in the control chamber to cause partition 70 to move downwardly all to close the inlet valve means, as soon as the float, due to a small drop in the level of liquid in the bowl from withdrawal of liquid by the drip device, lowers to force ball 92 off of its seat and thus open port 90, the excess pressure in the control chamber is relieved, spring 138 forces partition 70 away from the inlet port and the flow path is again completely open and liquid enters the bowl 18 until float 58 is raised from the mast 86 whereupon further filling is precluded by ball 92 closing port 90. Thus the float 58 rises and falls, in the embodiment of FIGURE 3 due to the selected and shown spacing from the top of rod 96 to the float 58 and of course this could be varied, only a small fraction of an inch during the cycle and hence the liquid level is constant for all practical purposes. Now assuming the liquid supply that is to be fed into section 100 is furnished intermittently or periodically, the parts will function as described hereinafter with respect to valve 92 being seated to prevent reverse flow and as mentioned above when the oil level falls and the float strikes the top of the mast, port 90 and inlet valve means 124 will be open. The latter conditions will exist until the periodic liquid supply is fed through the open inlet means following which liquid will enter the bowl 18 until the maximum level is attained resulting in the float rising and the valve device closing and the cycle may be repeated. As in the case with continuous supply, there can be no overfilling of bowl 18 no matter how long the periodic supply is applied and in either case the filling will be quick due to the relatively large flow areas and the small pressure differential maintained due to the action of the pressure regulator. It should be noted that the area of port 90 is small and thus only a small closing force can be exerted on ball 92 by the pressure in the control chamber and this is important together with the minimum pressure differential maintained across the liquid flow orifice in order to insure that all required operating forces are kept low, such as that required by the float 58 to open port 90.

During operation with a continuous supply of liquid, there is always a possibility of failure of the pressurization of the liquid supply and it is important to retain the contents of the service container for continued operation of the lubricator until the failure is discovered and repaired. If the supply pressure falls below the container pressure in the persent apparatus the liquid will tend to reverse flow out through conduit means 132. As soon as such flow commences, the valve device 92 is immediately forced against the seat of port 74 and flow is cut off with a maximum loss of only a few drops of liquid. Similarly when the liquid supply is fed to 100 intermittently or only occasionally, once the float seats on the mast to force ball 92 downwardly to open port 90, liquid from the container 26 will tend to flow out through the conduit means 132 and as described above force ball 92 to seat and close port 74 for all downward flow and thus here again for all practical purposes there is no loss of liquid. Assuming the lubricator 18 is positioned vertically as shown, the latter action would exist until the liquid level within container 18 was beneath ports 88 and exist again if container 26 was tilted sufficiently. Thus under all conditions, positive means has been provided for preventing reverse flow of liquid out of container 26. From the foregoing, all objects and advantages, including those enumerated, should be clear.

A slightly modified production version of the apparatus is illustrated in FIGURE 4, where most of the elements are basically the same in construction and operation. Chamber 56 is formed of lower and upper shells 140 and 142 provided with marginal screw threaded connections clamping between them the margin of diaparagm partition 144. The latter is centrally clamped between lower and upper members 146 and 148. The upper member is provided with an upstanding cylindrical wall 150 pierced by radial slots 152 for lateral fluid flow into compartment 184 and forming a pocket to freely receive a second valve device 154 similar to the first valve device 92. This device is adapted to seat on port or liquid flow orifice 156. Here again the control chamber, in the embodiment of FIGURE 4, includes area 171, slots 152 and compartment 184.

A boss 158 is formed integral with the upper wall of shell 142 and has a reduced upper end 160 provided with an annular bead 162. A hollow mast 164 is slotted at 166 to provide spring fingers grooved at 168 to snap on to bead 162 and provide a unitary assembly. Float 58 surrounds the mast and its cap 94 is adapted to seat on the upper end of the mast. An actuator member 170 fits loosely in the mast for vertical movement and its lower end contacts valve device 92. The latter is loosely retained in area 171 by star washer 128 and adapted to rise into sealing engagement with the seat of port 172.

The inlet arrangement is again a hollow boss having an upper section 174 with inlet port 175 and a lower section 176, the latter passing through aperture 102 in the container 26 and being retained by nut 106. The connection is sealed by O-ring 104. The metering and valving assembly is essentially the same as in FIGURE 3 except that the metering plug 112 is replaced by a porous sintered bronze plug 178 which provides the necessary liquid metering action. Spring 138 is similarly located for the same purpose. One or more ports 180 in shell 140 provide continuous open communication between compartment 182 and the interior of the container.

In operation, and with valve device 92 open as shown, spring 138 will move the partition upward until the upper edge of cylinder 150 contacts the upper wall of compartment 184. Pressure fluid or liquid supply may enter the inlet 176 and pass through the open inlet valve means and conduit means 132, unseating valve device 154, and will flow into the control chamber and through port 172 and slots 166 into the container. When the fluid rises to the desired level, float 58 will be lifted off mast 170 and further flow will cause valve device 92 to seal port 172. A small amount of continued flow will overcome spring 138 and cause closure of the valve means 124–132 in the inlet section. The cycle will repeat in the same way as in the apparatus of FIGURE 3 with continuous supply pressure and function the same as described with reference to FIGURE 3 with an intermittent or periodic liquid supply means applied at 176, all as should be apparent. Any initiation of reverse flow in conduit means 132 will promptly cause the second valve device 154 to seat on port 156 and prevent such flow for the same reasons as explained in connection with seating ball 92 on the seat of port 74.

It can be seen that when the overall passage from a control chamber to a container is open there is a pressure balance except for the action of spring 138. When port 90 or 172 is closed, the inlet valve means is closed by the supply liquid as soon as the control chamber pressure rises only a small amount. Thus there are no large differential pressures within the device itself at any time and consequently all forces are low, and the control device and float can be minimum size and weight which also results in a maximum amount of liquid being storable in the lubricator bowl. It is also of course to be noted that the service container may be the lubricator bowl itself or it may be a separate unit mounted adjacent to the lubricator bowl and in flow communication therewith.

It will be apparent to those skilled in the art that various changes may be made in the construction and arrangement of parts as disclosed without departing from the spirit of the invention, and it is intended that all such changes shall be embraced within the scope of the following claims.

I claim:

1. Apparatus for providing a supply of liquid to a liquid-using system, comprising: a service container, a filling control device mounted in said container; said container being adapted to hold a desired quantity of liquid for use by said system; said control device being adapted to control the flow of pressurized liquid from a source to the container; said control device comprising a hollow actuating chamber having a movable partition dividing it into first and control compartments; the first compartment being continuously open to the liquid in said container; the control compartment having a closable port communicating with the liquid in said container; said chamber having an inlet port in one wall flow-connected to receive pressurized liquid from the source; conduit means carried by and extending through said partition and communicating at one end with said inlet port and at the other end with the control compartment to transmit pressurized liquid from the source thereto; valve means at said inlet port closed by movement of the conduit means toward said port and opened by movement of the conduit means away from said port; resilient means in the first compartment to urge the partition and conduit means away from the inlet port and normally hold open the valve means thereat; a float in said container adapted to rise and fall with the liquid level therein; valve means to control said closable port in the control compartment and responsive to the position of said float to open said port when the float falls below predetermined level and to close said port when the float rises above a predetermined level to seal off the control compartment from the container and permit the incoming liquid to increase pressure in the control compartment to a value greater than the sum of the resilient means and the container pressure in the first compartment; the excess pressure in the control compartment serving to move the partition and conduit means toward the inlet port to close the valve means thereat and terminate the inflow of pressurized fluid.

2. Apparatus as claimed in claim 1; the valve means at the inlet port comprising a liquid-impermeable seal member and the inlet end of said conduit means.

3. Apparatus as claimed in claim 1 wherein there is provided adjacent the end of said conduit means communicating with the control compartment means operable to prevent reverse flow of liquid out of the container.

4. Apparatus for providing a supply of liquid to a liquid-using system, comprising: a service container adapted to hold a desired quantity of liquid for use by said system and to be replenished by an external source of pressurized liquid supply; filling control means to control the flow of liquid from the source of supply to the container; the control means including conduit means forming a flow path having an inlet end for connection to the source of supply and an outlet end communicating with the container; inlet valve means in the flow path to control said inlet end and cut off the inflow of liquid on occasion; and servo mechanism to operate said inlet valve means; said servo mechanism including a first portion adapted to yieldingly urge the inlet valve means to open position and normally hold it open; and said servo mechanism including a second portion adapted to operate in response to increased pressure to overcome said first portion and move the inlet valve means to closed position on occasion; float means in said container adapted to rise and fall with the level of liquid in the container; and outlet valve means in the flow path to control said outlet end; said outlet valve means acting in response to the rise of said float means above a predetermined level to close said outlet end and cause the increased pressure from the liquid supply to be applied to the second portion of the servo mechanism to close the inlet valve; said outlet valve means acting in response to the fall of said float means below a predetermined level to open said outlet end and relieve the increased pressure on said second portion of the servo mechanism to open the inlet valve means.

5. Apparatus as claimed in claim 4; the first portion of said servo mechanism including a compartment open at all times to the container and filled with liquid at container pressure, and a resilient pressure device in said compartment to yieldingly urge the inlet valve to open position; the second portion of said servo mechanism including a control compartment open to the container when said outlet valve is open to contain liquid at container pressure to balance the pressure in the first mentioned compartment, and cut off from the container when the outlet valve is clostd, whereby pressure is increased by incoming liquid to overcome the resilient pressure device and close the inlet valve.

6. Apparatus as claimed in claim 4; the conduit means being sealable in response to reduction of supply pressure below container pressure to prevent reverse flow of liquid out of the container.

7. A liquid filling control device for use with a service container to control the flow of pressurized liquid thereto comprising: a hollow actuating chamber having a movable partition dividing it into first and control compartments; the first compartment having a port in one wall adapted to be in continuously open communication with the interior of the container; the control compartment having a port in one wall adapted to be in communication with the interior of the container and adapted to be closed by a valve device on occasion; said chamber having an inlet port in one wall adapted at its outer end for connection to a source of supply of pressurized liquid; conduit means extending between said inlet port and said control compartment to transmit pressurized liquid to the latter; valve means in the inlet port actuated by said movable partition to close said conduit means upon movement of the partition toward the inlet port and to open said conduit means upon movement of the partition away from the inlet port; resilient means in the first compartment to urge the partition away from the inlet port and normally hold open the valve means therein; a valve device in said control compartment adapted to close the port in the compartment wall and cut off communication with the interior of the container; and an actuator member adapted to control the opening and closing of said valve device; said control compartment, when closed off from the container interior, being adapted to be filled with pressurized supply liquid to overcome the opening force of the first compartment and cause closing of the valve means in the inlet port.

8. A control device as claimed in claim 7; said valve device being movable to close the control compartment end of said conduit means to prevent reverse flow of liquid out of the container.

9. A control device as claimed in claim 7; and an additional valve device in said control compartment movable to close the control compartment end of said conduit means to prevent reverse flow of liquid out of the container.

10. A control device as claimed in claim 7; said conduit means extending through said movable partition.

11. A control device as claimed in claim 10; said conduit means being carried by said movable partition; the inlet port end of the conduit means serving as a portion of the valve means to control inflow of pressurized liquid.

12. A control device as claimed in claim 7; said chamber being adapted to be mounted in an upright position in the service container; said inlet port including a conduit section extending from the lower wall of the chamber to pass through an aperture in the lower wall of the container; the outer free end of the conduit section being adapted for connection to a pressurized liquid supply conduit; the first compartment being located adjacent to the inlet port and the control compartment being located above the first compartment; the port in the control compartment being located in the upper wall thertof; a hollow mast extending upwardly from the chamber in alignment and in communication with the control compartment port and being open to the container; the actuator member comprising a slender elongate rod vertically slidably mounted loosely in said mast with its lower end in contact with the valve device and with its upper end adapted to contact a float within said container; the actuator member being adapted to be moved downwardly by the weight of the float when the latter falls below a predetermined level to move the valve device to open position to allow flow of liquid into the container, and adapted to be moved upwardly by the valve device when the float rises above a predetermined level.

13. A control device as claimed in claim 12; said conduit means being arranged vertically in alignment with the control compartment port and the mast; said valve device being adapted to move downwardly into contact with the upper end of said conduit means to seal it against downward flow of liquid therethrough.

14. A control device as claimed in claim 12; said conduit means being arranged vertically in alignment with the control compartment port and the mast; and an additional valve device in said control compartment adapted to move downwardly into contact with the upper end of said conduit means to seal it against downward flow of liquid therethrough.

15. A control device as claimed in claim 7; the flow path through the device being highly restricted to provide a small constant rate of flow into the container, thereby reducing the valve operating forces to a minimum.

16. A liquid filling control device for use with a service container to control the flow of pressurized liquid thereto comprising control means including conduit means forming a flow path having an inlet end for connection to a source of liquid supply and an outlet end communicating with the container, inlet valve means in the flow path to control said inlet end and cut off the inflow of liquid on occasion, and servo mechanism in the form of a pressure regulator to operate said inlet valve means comprising a first portion adapted to yieldingly urge the inlet valve means to open position and normally hold it open and a second portion adapted to operate in response to increased pressure to overcome said first portion and move the inlet valve means to closed position on occasion, float means in said container adapted to rise and fall with the level of liquid in the container; and outlet valve means in the flow path to control said outlet end, said outlet valve means acting in response to the rise of said float means above a predetermined level to close said outlet end and cause the pressure applied to the second portion of the servo mechanism to increase and thus close the inlet valve; said outlet valve means acting in response to the fall of said float means below a predetermined level to open said outlet end and relieve the pressure on said second portion of the servo mechanism to open the inlet valve means.

17. Apparatus as claimed in claim 16 wherein the conduit means includes means operable to prevent reverse flow of liquid out of the container.

18. A liquid fill device for use with a service container to control the flow of pressurized liquid thereto comprising control means including conduit means forming a flow path having an inlet end for connection to a source of liquid supply and an outlet end communicating with the container, an inlet valve in the flow path to control said inlet end, a float adapted to rise and fall with the level of liquid in the container, an outlet valve in the flow path to control the outlet end, said outlet valve acting in response to float rise to close the outlet end and in response to float lowering to open the outlet end, a partition movable in one direction upon rise of the float to cause closing of the inlet valve and movable in an opposite direction to open the inlet valve upon a lowering of the float, said partition being constantly pressurized on one side at service container pressure, tending to open the inlet valve and pressurized on its opposite side by fluid received from the liquid supply, tending to close the inlet valve, the pressure on the opposite side being a minimum value above service container pressure when said inlet and outlet valves are closed, whereby the outlet valve may be opened upon float lowering with a minimum force.

19. Apparatus as defined in claim 18 including means for metering the flow of liquid through said inlet valve.

20. A liquid filling control device for use with a service container to control the flow of pressurized liquid thereto comprising control means including conduit means forming a flow path having an inlet end for connection to a source of liquid supply and an outlet end communicating with the container, inlet valve means in the flow path to control said inlet end and cut off the inflow of liquid on occasion, said control means including a movable member and a control chamber, a first portion adapted to yieldingly urge the inlet valve means to open position and normally hold it open, said control means being adapted to operate in response to increased pressure in said control chamber to overcome said first portion and move the inlet valve means to closed position on occasion, float means in said container adapted to rise and fall with the level of liquid in the container; and outlet valve means in the flow path to control said outlet end, said outlet valve means acting in response to the rise of said float means above a predetermined level to close said outlet end and cause the pressure to be increased in said control chamber to close the inlet valve and terminate the inflow of pressurized liquid; said outlet valve means acting in response to the fall of said float means below a predetermined level to open said outlet end and relieve the pressure in said control chamber to open the inlet valve means.

References Cited

UNITED STATES PATENTS 2,781,772    2/1957    Russell _____ 137—414 X

HOUSTON S. BELL, JR., *Primary Examiner.*

U.S. Cl. X.R.

137—429; 141—229; 184—6, 55, 103